March 20, 1951 — A. F. SEVIOLA — 2,546,079
FOLDING ICE FISHING ROD
Filed July 19, 1949 — 2 Sheets-Sheet 1
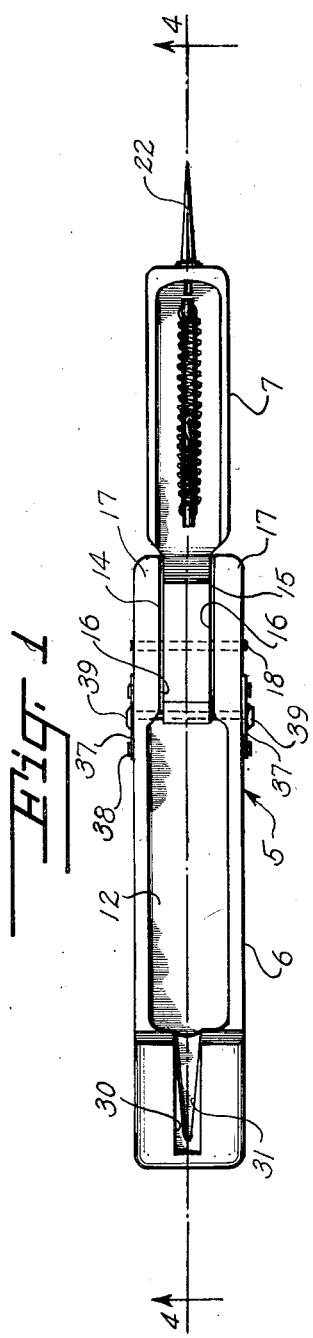
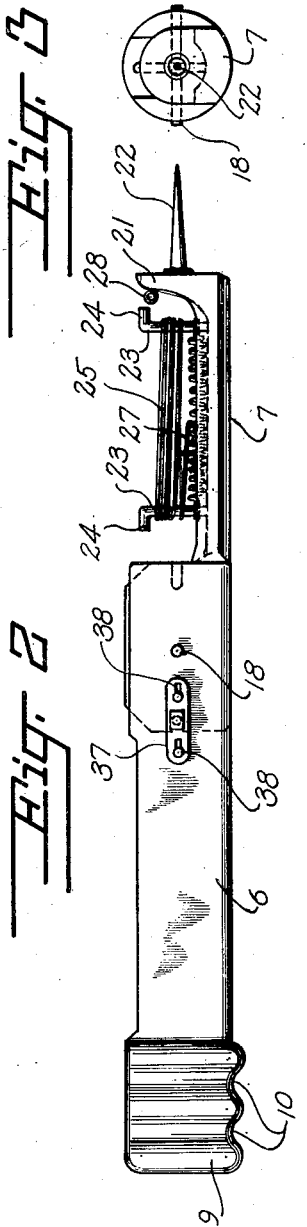
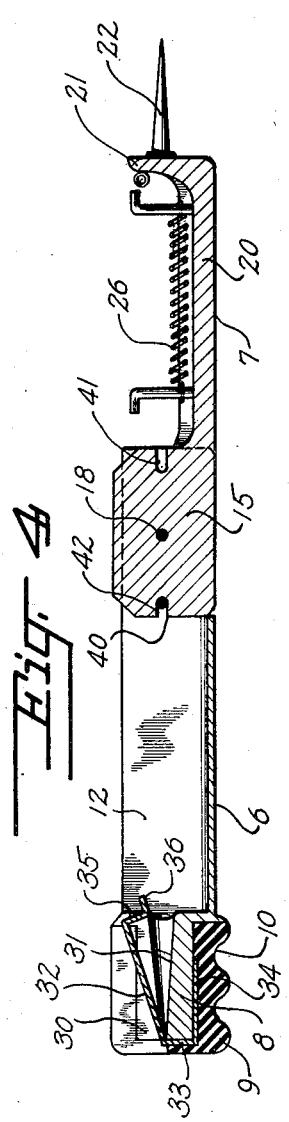
*INVENTOR.*
Albert F. Seviola
BY Victor J. Evans & Co.
ATTORNEYS March 20, 1951  A. F. SEVIOLA  2,546,079
FOLDING ICE FISHING ROD
Filed July 19, 1949  2 Sheets-Sheet 2
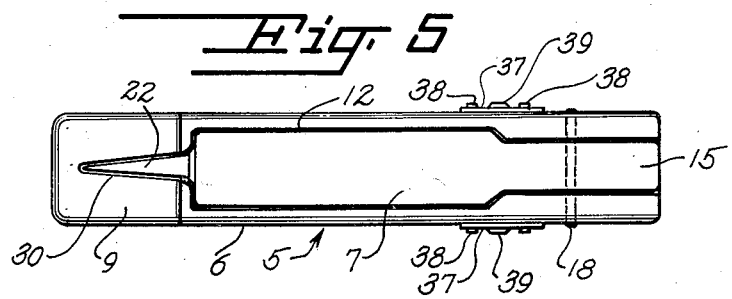
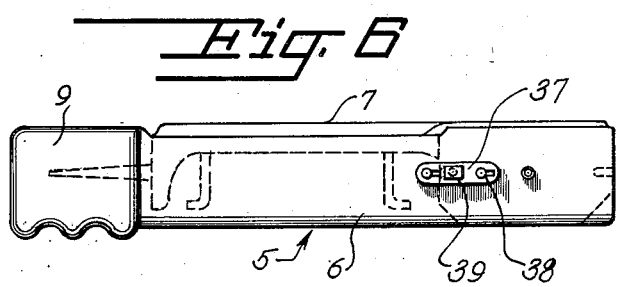
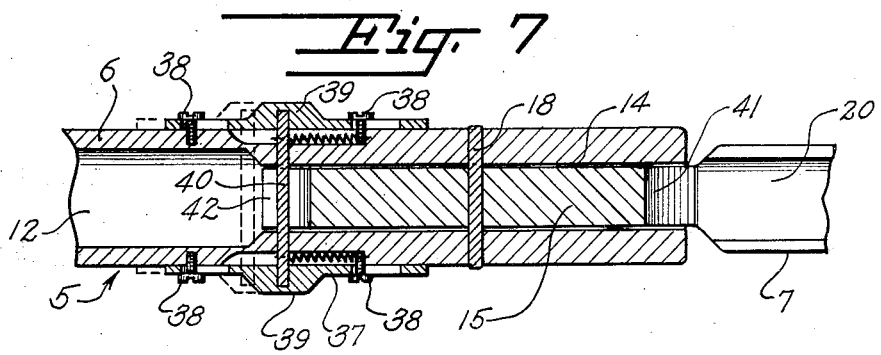
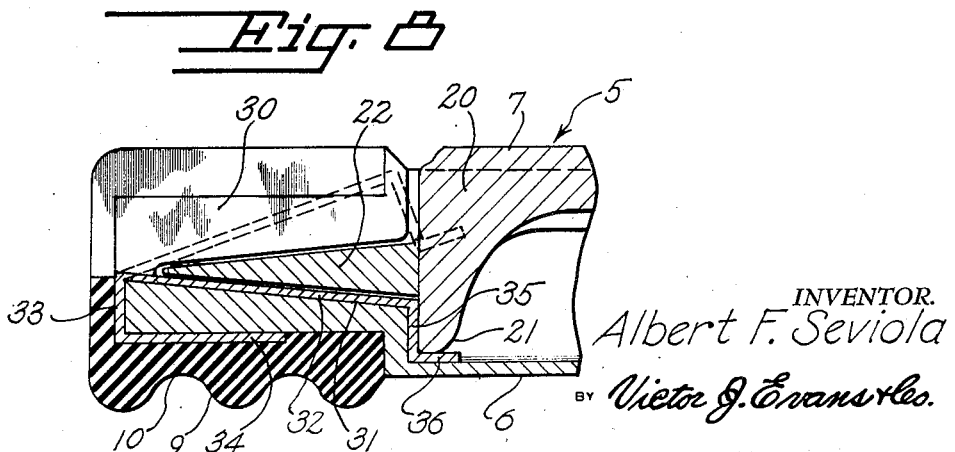
INVENTOR.
Albert F. Seviola
BY Victor J. Evans & Co.
ATTORNEYS Patented Mar. 20, 1951

2,546,079

UNITED STATES PATENT OFFICE 2,546,079

FOLDING ICE FISHING ROD

Albert F. Seviola, Minneapolis, Minn.

Application July 19, 1949, Serial No. 105,613

3 Claims. (Cl. 43—18)

The present invention relates to fishing implements and more particularly to a combination folding fishing rod, spear and line holder.

One object of the invention is to provide a folding fishing rod which is particularly adapted for use in ice fishing which is generally practiced in the fresh water lake region during the winter months when the lakes are frozen, by cutting a hole through the ice and dropping a line to the bottom of the water. The folding fishing rod is so constructed as to provide a spear point on one end thereof which can be conveniently jabbed into the ice in order to hold the rod in upright or standing position by the hole while the fisherman waits for a strike.

Another object is to provide a folding fishing rod of the above mentioned type which can be conveniently opened or closed to facilitate easy storage and the carrying thereof in a compact unit within the pocket or in a vehicle without the danger of tearing the clothes of the fisherman or otherwise damaging fabric such as the car upholstery.

Another object is to provide a folding fishing rod having a hook support which is adapted to yieldingly tension the fish line after the same has been coiled about opposed supports carried by the fishing rod.

Another object is to provide a folding fishing rod having a spear which is adapted to be received within a protective chamber when the rod is in its folded position, so as to prevent damage when the folded rod is carried in the pocket or the like.

Another object is to provide a latch for the pivot joint of the folding rod for releasably holding the pivoted rod sections in an extended or folded position.

Other objects and advantages of the invention will become apparent during the course of the following description of the accompanying drawings, wherein:

Figure 1 is a top elevational view of the fishing rod showing the same in its extended or projected position for use.

Figure 2 is a side elevational view of the folding fishing rod showing the manner in which the hand line is supported and the yelding holding means for receiving the hook.

Figure 3 is an end elevational view looking in the direction of the spear end of the fishing rod.

Figure 4 is a longitudinal cross sectional view taken on line 4—4 of Figure 1 and looking in the direction of the arrows to illustrate the structure of the folding rod, and the manner in which the sections are hingedly connected one to the other.

Figure 5 is a top elevational view of the fishing rod showing the same in its folded position and illustrating the manner in which the spear end is received in the protective chamber of the handle.

Figure 6 is a side elevational view of the fishing rod in its folded position showing the manner in which the same is locked when folded.

Figure 7 is an enlarged fragmentary cross sectional view taken longitudinally through the latch mechanism for releasably holding the rod in its folded or retracted position, and Figure 8 is an enlarged fragmentary cross sectional view of one end of the folded fishing rod illustrating the manner in which the spear is received in its protective chamber and showing the yielding spring means for urging the rod sections apart when the latch is released.

In the drawings, and more in detail, there is shown for the purpose of convenience of illustration a folding fishing rod generally designated 5, including a shank section 6 and a rod section 7. The shank section 6 is reduced in diameter to provide an end portion 8 for receiving a handle 9 of rubber or other composition. The handle being provided with finger receiving depressions 10 to facilitate ease in grasping the rod.

The section 6 is of round section and is provided with an inwardly extending radially directed slot 12 to form a chamber for receiving the section 7 when the rod is in its folded position. One end of the section 6 is formed to provide a narrow passageway 14 which communicates with the chamber 12 and forms a socket or opening for receiving the tang 15 of the section 7, the tang 15 being reduced in width to provide flat side wall surfaces 16 corresponding in shape to the passageway 14 so that said tang may be pivoted between the ends 17 of the section 6 by means of a suitable pivot pin 18.

The section 7 and tang 15 are formed integral, and the section 7 is fashioned to provide a forwardly extending portion 20 having an upturned angular end portion 21 from which projects a spear point 22 in direct alignment with the axis of the pole, it being noted that the section 7 and forwardly projecting portion 20 are offset in parallel relation with the axis of the pole.

Extending upwardly from the forwardly projecting portion 20 of the section 7 is a pair of spaced line holding brackets 23 having angular end portions 24 to prevent displacement of a fishing line wrapped therearound as shown in Fig. 2, and extending between the arms 23 is a coil spring 26 having its ends affixed to said arms for receiving the fish hook 27 on the line 25 in one of the convolutions thereof so as to hold the hook and place the line under tension.

Secured to the angular end portion 21 of the section 7 is an eye 28 for the passage of the fishing line 25 when the fishing pole is in use. The reduced handle end 8 is formed with a radially extending slot 30 for receiving the spear 22 when the sections 6 and 7 are in their folded position, and the central portion of said slot is provided with a tapered bore 31 corresponding in shape to the spear end 22 so as to receive said end and house the same when the rod is in its closed position.

A yielding leaf spring 32 is mounted in the slot 30 and has one end angularly bent as at 33 to embrace the end of the handle section 8 so that the end portion 34 may be clampingly held in place by the rubber handle ferrule 9. The opposite free swinging end of the leaf spring 32 is likewise angularly bent as at 35 and terminates in a projection 36 extending into the chamber 12 of the handle section 6. The projection 36 is adapted to engage the angular extension 21 of the rod section 7 and yieldingly urge the same outwardly of the chamber 12 when it is desired to open the rod for use.

The latch structure for holding the rod sections 6 and 7 in an extended or retracted position includes a pair of sliding plate members 37 having pin and slot connections 38 with the side walls of the section 6. Projections 39 are formed on the sliding plates 37 to facilitate sliding movement of said plates and a latch pin 40 extends through a slot in each side wall of the chamber 12 and has its ends connected to the sliding plates 37. The pin 40 is adapted to engage a slot 41 extending inwardly from one wall of the tang 15 to hold the section 7 within the chamber 12, and similarly, the latch pin 40 is adapted to engage within a slot 42 in the opposite end of the tang 15 to hold the rod section 7 in its extended or operative position.

In use, the latch pin 40 is removed by manipulating the thumb piece 39 on each side of the rod which causes the latch pin 40 to disengage from its slot 41—42 depending upon whether the rod sections are folded or extended to permit said sections to be either folded or extended as shown in Figures 5 and 6 (folded) or Figures 1 to 4 (extended). In view of the fact that the leaf spring 32 yieldingly urges the sections 6 and 7 apart from their folded position (Figs. 5 and 6), the opening or unfolding of the sections will be initiated by simply releasing the latch pin 40 from its corresponding slot 41 and manually extending the sections to their projected position after which the latch pin 40 is projected into the slot 42 to hold the sections extended in a locked position.

It is to be understood that the form of the invention herewith shown and described is to be taken as a preferred embodiment thereof, and that various changes in the shape, size and arrangement of parts may be resorted to without departing from the spirit of the invention or the scope of the subjoined claims.

What I claim is:

1. In a folding fishing rod, a handle section having a longitudinal chamber therein and a slot extending inwardly from one end thereof, a rod section pivotally mounted within said slot to fold within said chamber, a protective chamber in said handle section, a spear on said rod section adapted to be received in said protective chamber, said protective chamber being in communication with the first mentioned chamber, and means for holding said handle and rod sections in their folded and projected positions.

2. In a folding fishing rod, a handle section having a longitudinal chamber extended at one end to form a reduced chamber and at the other end to provide a slot extending transversely of the handle section, a fishing rod section having a tang received in said slot, said tang being formed with slots in each end thereof, pivot pin means for holding said sections together, and a sliding latch pin at one end of said longitudinal chamber adapted to be slidably received selectively in said slots at each end of the tang to hold the sections in their folded and extended positions.

3. In a folding fishing rod, a handle section having a longitudinal chamber reduced at one end to form a guard housing, and formed at its opposite end to provide a pair of spaced wall surfaces, a rod section having a tang at one end pivotally mounted between said wall surfaces, said tang being formed with slots in the opposite ends thereof, a sliding latch member carried by the handle section and adapted to be alternately received in said slots in the tang of said rod section to hold the rod section in its folded and extended positions, a spear on one end of said rod section adapted to be received in said guard chamber when the sections are in their folded position, and yielding spring means mounted in said guard housing and adapted to force the sections apart from a folded position upon release of the latch means.

ALBERT F. SEVIOLA.

REFERENCES CITED

The following references are of record in the file of this patent:

UNITED STATES PATENTS

| Number | Name | Date |
| --- | --- | --- |
| 895,372 | Hostetter et al. | Aug. 4, 1908 |
| 1,056,404 | Lorenzo | Mar. 18, 1913 |